P. EDTBAUER.
COFFEE PERCOLATOR.
APPLICATION FILED AUG. 27, 1908.

948,108.

Patented Feb. 1, 1910.

Witnesses
O. M. Hennick
E. K. Lundy

Inventor
Petronella Edtbauer
by Frank D. Thomason
Atty

UNITED STATES PATENT OFFICE.

PETRONELLA EDTBAUER, OF CHICAGO, ILLINOIS.

COFFEE-PERCOLATOR.

948,108.  Specification of Letters Patent.  Patented Feb. 1, 1910.

Application filed August 27, 1908. Serial No. 450,564.

*To all whom it may concern:*

Be it known that I, PETRONELLA EDTBAUER, a citizen of the United States, and a resident of Chicago, in the county of Cook and State of Illinois, have invented certain new and useful Improvements in Coffee-Percolators, of which the following is a clear, full, and exact description.

My invention relates to coffee pots and more particularly to that class of devices known as coffee percolators.

As is well known coffee should not be boiled, but only steeped from five to ten minutes, such as is permitted by passing boiling water through granulated or pulverized coffee beans held in a porous receptacle. This has been accomplished in various ways, such for example as holding the ground coffee in a muslin bag or sack and allowing the water to pass through the same. While this is a simple method it has many disadvantages, the most prominent of which is that, after several uses the woven fabric of the bag becomes so thoroughly saturated or impregnated with the injurious sediment from the grounds, that it is rendered unsanitary and extremely injurious to the health. During my experiments I have ascertained that the time of percolation should be regulated in proportion to the amount of ground coffee placed in the receptacle so that the liquid will have passed through said ground coffee in not more than ten minutes. As soon as hot or boiling water is poured on ground coffee the small granulations begin to swell for a certain period and as they become chilled the tannin or tannic acid of the coffee bean is liberated. This I have found will occur under ordinary circumstances in about ten minutes after the boiling water has been poured on the ground coffee. Therefore if the percolator can be adjusted in proportion to the amount of ground coffee (pulverized) so that the boiling water after being poured over the same will have percolated through before the reaction takes place the beverage will be pure, clean, and healthful.

One of the objects, therefore, of my invention is to provide a percolator wherein the flow of water through the filter or sieve shall be regulated according to a fixed proportion or made adjustable to various proportions.

Another object is to provide an economical and simply constructed device that is easy to operate, will not get out of order, and which can be thoroughly cleansed and rendered entirely sanitary. This I accomplish by the means hereinafter fully described and as more particularly pointed out in the claims.

Figure 1:
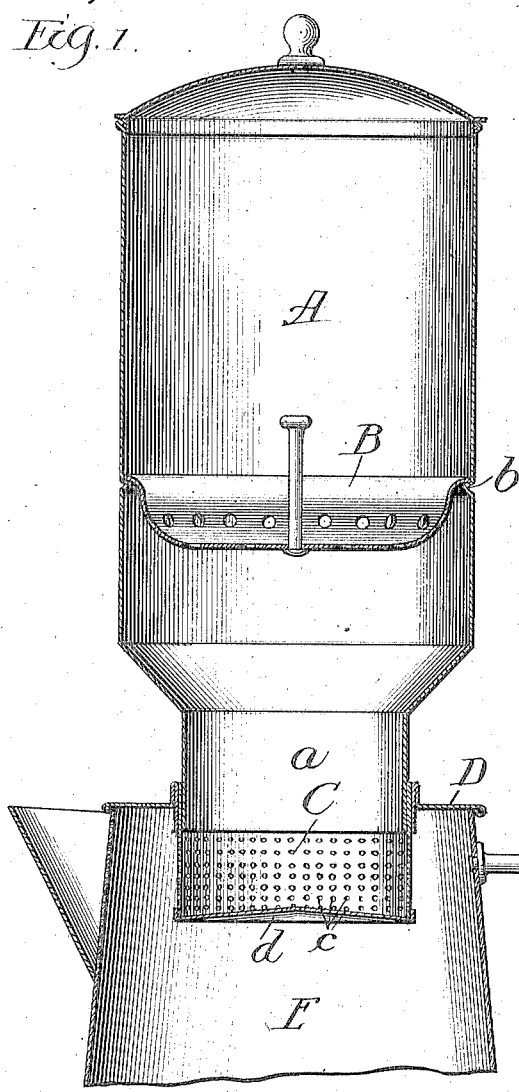
Figure 4:
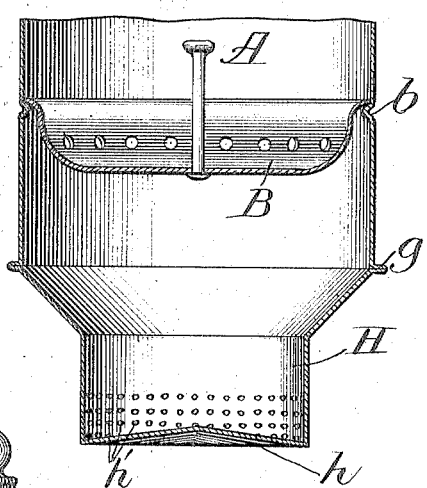
Figure 2:
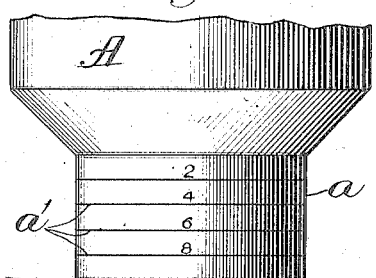
Figure 3:
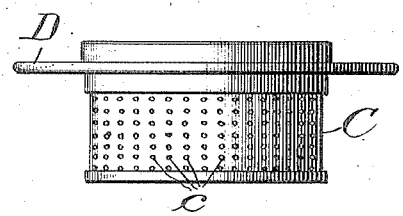

In the drawings:—Figure 1, is a central vertical section of my improved percolator showing the same supported upon the top of an ordinary coffee pot, which latter is shown in fragmental section. Fig. 2, is a fragmental front elevation of the lower portion of the water reservoir, showing the adjusting graduations thereon for regulating the flow of water. Fig. 3, is a vertical front elevation showing my improved percolator strainer in detail. Fig. 4, is a fragmental view, in central vertical section, showing a modified form of my percolator.

Referring to the drawings, A represents a suitable reservoir or water receptacle that is preferably made cylindrical in shape and is open at both ends. The lower portion of this receptacle is preferably tapered or conically shaped so as to form a reduced portion or throat $a$, while the upper open end is provided with a suitable lid. Mediate the top and bottom of this receptacle the walls thereof are provided with a small annular bead $b$ that is adapted to support a dish shaped spreader plate B. The throat $a$ is adapted to be inserted into and surrounded by a percolator cap or filter C that is preferably slightly greater in diameter than the circumference of said throat and has a plurality of small perforations $c$ in its side walls. The bottom of this percolator cap, however, is imperforate and preferably made dome shape or conical so as to shed to the sides of the cap. The upper edge of the cap is secured to and surrounded by an annular plate D (preferably T shaped in cross section) that is of such diameter that its outer edges extend to and project over the edge of an ordinary coffee pot E. The exterior surface of throat $a$ is provided with graduations, as shown in Fig. 2 that indicate the relative adjustment of the percolator cap C on the lower end of the water receptacle according to the quantity of water used.

In operation, when the required amount of coffee has been placed in the percolator cap, the same is slid onto the throat to the graduation indicating the number of cups of water to be placed therein, and then the same is mounted upon the coffee pot. The spreader plate B is then placed in position, and the water poured into the top of the receptacle. This will cause the water to spread over the coffee grounds and percolate through the same and out through the perforations c into the pot. Owing to the dome shape of bottom of percolator cap, the water will not settle in the center but will be distributed or shed toward the sides of same so that none will remain in contact with the grounds.

In the modification I have shown in Fig. 4 the percolator cap is made integral with the reservoir or water receptacle by closing the lower end of the throat H with a dome shaped bottom h and by perforating the side walls thereof. In order that the receptacle may be placed upon coffee pot the lower edge of reservoir is provided at the place where it is tapered to form the throat, with an outwardly extending flange g, substantially as shown. In this modification the receptacle is provided with a spreader plate similar to the one shown preferred form. The adjustment of the amount of water to be used is ascertained by the number of perforations in the side walls of the throat. It will of course be understood that while I have described in a specific manner the carrying out of my invention, I do not desire to be limited to such a construction but contemplate the use of any means whereby the percolating of the water through the coffee grounds may be adjusted with respect to the quantity of coffee to be brewed.

What I claim as new is:—

1. The combination with a coffee pot, of superimposed percolating receptacle provided with a depending extension adapted to enter said coffee pot, a percolator cap adapted to telescope with said extension and having its lower end closed and the sides adjacent to and surrounding said extension being perforated.

2. The combination with a coffee pot, of a superimposed percolating chamber provided with a depending extension adapted to enter said coffee pot and provided with graduations on the extension of its side walls, a percolator cap adapted to telescope with said extension and adjustable thereon with relation to said graduations, the bottom of said cap being closed and the sides adjacent to and surrounding said extension being perforated.

3. The combination with a coffee pot, of a superimposed percolating chamber provided with a depending extension adapted to enter said coffee pot, and a percolator cap adapted to telescope with said extension and having its lower end closed with a conical-shaped bottom and its sides adjacent to said bottom perforated.

4. The combination with a coffee pot, of a superimposed percolating chamber provided with a depending extension adapted to enter said coffee pot and provided with graduations on the extension of its side walls, a percolator cap adapted to telescope with said extension and adjustable thereon with relation to said graduations, the bottom of said cap being conical-shaped, and a spreader-plate in said receptacle above said extension.

In testimony whereof I have hereunto set my hand and seal this 24th day of August, A. D., 1908.

PETRONELLA EDTBAUER. [L. S.]

Witnesses:
EDMUND EDTBAUER,
E. K. LUNDY.